US005490091A

United States Patent [19]
Kogan et al.

[11] Patent Number: 5,490,091
[45] Date of Patent: Feb. 6, 1996

[54] HISTOGRAMS OF PROCESSED NOISE SAMPLES FOR MEASURING ERROR RATE OF A PRML DATA DETECTION CHANNEL

[75] Inventors: Andrew Kogan; Alexander Taratorin; Alexander Tesler; Dmitry Varsanofiev, all of Palo Alto, Calif.

[73] Assignee: Guzik Technical Enterprises, Inc., San Jose, Calif.

[21] Appl. No.: 203,357

[22] Filed: Mar. 1, 1994

[51] Int. Cl.$^6$ .................................................. G11B 5/09
[52] U.S. Cl. ............................. 364/554; 371/5.1; 360/53
[58] Field of Search ................................ 324/212, 600, 324/601, 612, 613, 614, 615; 360/51, 53, 40, 46, 36; 364/554; 371/3, 5.1–5.5, 2.1, 4, 20.6, 23, 24

[56] References Cited

U.S. PATENT DOCUMENTS

| | | | |
|---|---|---|---|
| 4,578,721 | 3/1986 | Brannan | 360/51 |
| 4,947,394 | 8/1990 | Nakajima et al. | 371/5.1 |
| 5,121,263 | 6/1992 | Kerwin et al. | 360/53 |
| 5,123,020 | 6/1992 | Yoshimura et al. | 371/68.1 |
| 5,233,482 | 8/1993 | Galbraith et al. | 360/46 |
| 5,355,261 | 10/1994 | Torntorin | 360/53 |

OTHER PUBLICATIONS

Thapar & Patel, A Class Of Partial Response Systems For Increasing Storage Density In Magnetic Recording. IEEE Trans. on Mag., Sep. 1987, pp. 3666–3668.
Ziperovich, Performance Degradation of PRML Channels Due To Nonlinear Distortions, IEEE Trans. On Mag., Nov. 1991, pp. 4825–4827.
Cideciyan, Dolivo, Herman, Hirt, & Schott, A. PRML System For Digital Magnetic Recording, IEEE Journ. On Sel. Areas In Comm., Jan. 1992, pp. 38–56.
Palmer & Coker, Media Design Considerations For A PRML Channel, IEEE Trans. On Mag., Jan. 1993, pp. 189–194.
Wood & Petersen, Viterbi Detection Of ClassIV Partial Response On A Magnetic Recording Channel, 34 IEEE Trans. On Comm. 454–461, 1986.
Howell, McCown, Diola, Tang, Hense & Gee, Error Rate Performance Of Experimental Gigabit Per Square Inch Recording Components, IEEE Trans. On Mag., Sep. 1990, pp. 2298–2302.
Wood, Turbo–PRML, A Compromise EPRML Detector, IEEE paper, 1993. pp. 4018–4020.
Che, Barbosa & Bertram, Performance Estimation Considering Medium Noise Down Track Correlations, IEEE paper, 1993, pp. 4062–4064.

*Primary Examiner*—James P. Trammell
*Attorney, Agent, or Firm*—David Pressman

[57] ABSTRACT

A method and apparatus for measuring the error rate of a magnetic recording device, such as a hard disk storing a set of data. The apparatus has a partial response maximum likelihood data detecting channel (PRML channel) which differs from a conventional PRML channel by including a noise processing unit (66) which is connected between the output of an A/D converter (54) and the input of a sequence detector (60), and a histogrammer (70), which is connected to the output of a noise processing unit. The method consists of estimating a sequence of noise samples received from the output of the A/D converter (54), processing the sequence of noise samples according to a plurality of predetermined sets of processing coefficients, accumulating a plurality of histograms of segregated processed noise samples, and processing the plurality of histograms so as to determine a dependence of a number of errors on a preselected criterion which characterizes a signal-to-noise ratio of the PRML channel. The above dependence can be extrapolated for an actual error rate of the channel being tested.

25 Claims, 6 Drawing Sheets

HISTOGRAMS OF PROCESSED NOISE SAMPLES FOR MEASURING ERROR RATE OF A PRML DATA DETECTION CHANNEL

CROSS-REFERENCE TO RELATED APPLICATIONS

The invention of this application is related to that of the following U.S. patent applications: Alexander Taratorin, Ser. Nr. 08/169,004, filed 1993 Dec. 20 U.S. Pat. No. 5,355,261 and Alexander Taratorin and Alexander Tesler, Ser. Nr. 08/185,252, filed 1994 Jan. 24.

FIELD OF THE INVENTION

The present invention relates to the field of magnetic recording, particularly to the measuring of an error rate for disk drives, based on the detection of data by means of a digital data processing method.

DESCRIPTION OF PRIOR ART

Definition of PRML—FIG. 1

Prior to being assembled into computers or other data-processing apparatus, hard disks and read-write heads of computer disk drives are usually inspected and checked for various characteristics, such as signal-to-noise ratio, pulse width, asymmetry, etc. Error rate, the most universal indicator of the overall quality of the disk-drive components, is also checked.

Physically, an error rate is the number of errors a computer disk drive assembly produces during its operation. For hard disks, the error rate is a ratio of the number of errors per given number of bits written on the disk. For reliable operation of the disk, the error rate should be less than one error per $10^9$ or $10^{10}$ bits.

Since the direct counting of absolute errors on such a huge number of bits requires an extremely long period of time, the error rate is usually evaluated indirectly, e.g., by probability methods, such as a bit-shift phase margin method disclosed in U.S. Pat. No. 4,578,721, issued in 1986 to G. Brannan, Jr. This method is based on changing the widths of windows in a data separator and counting the number of data pulses which fall beyond prescribed windows. In the field of magnetic recording, a window is a time interval which is defined by clock signal. Depending on a data detection process, the data pulses are assigned to specific windows having different widths. A device which sorts the data pulses to specific windows is called a data separator. It is important that each data pulse be placed into a window to which it is assigned. The method described above makes it possible to determine the dependence of the number of errors on the data window's width and thus to extrapolate the relationship to the actual window's width. This enables an actual error rate for the object being tested to be estimated in a relatively short period of time.

Although this method is rather efficient and finds wide application, it is applicable only to disk drives which have a signal-detection component known as a disk-drive channel which operates on a peak-detection principle. This principle is based on the detection of the peaks of received signals. However, the peak-detection principle is usable only in a system with a relatively low density of magnetic recording. This is because, with an increase in recording density, the width of the peak itself increases to the extent that it becomes of the same order of size or even greater that the distance between consecutive pulses.

Nowadays, however, a growing demand exists for recording with very high densities, and new methods are required to meet this demand. One solution to the above problem is a method which is known as the "partial response maximum likelihood" (PRML) method. The PRML method has recently begun to find ever-growing applications. The PRML method is implemented by an electronic circuit which constitutes a part of a disk drive unit and is used for data detection.

The PRML method synchronously samples readback signals coming from the read head. The selected signals are filtered (equalized), so that the sampling of a pulse to be detected produces a predefined sequence of values. The sequence which is used for the most popular type of PRML method, and which is called the PR4 sequence, is shown in FIG. 1. This drawing shows two sequential sinusoidal waveforms and the positions of sample points. It can be seen that samples are taken sequentially only in the points where signals have only +1, 0, and −1 values. This facilitates processing the data in a binary coded form.

When the detector observes a pair of +1 samples, it detects a positive pulse. Likewise, if a pair of −1 samples is observed, a negative pulse is detected. Therefore, one pulse written on a disk medium results in two samples (or more, depending on the particular PRML method). In other words, two samples are taken for each event, and therefore each point constitutes only a part of the response to the signal read by the head. From this particular definition the term "partial response" has been derived.

If two transitions are written closely enough, their readback pulses overlap. This overlap is known as an Inter-Symbol Interference (ISI). An ISI causes peaks in the signal to be shifted in time and their values to be reduced. This, in turn, causes errors in a peak detection channel. In contrast to this, in a PRML channel, the overlapping of pulses does not cause an error, because the assigned sequence is always preserved. This is indicated in FIG. 1 by a waveform drawn by the broken lines where, in spite of the fact that the positive and negative pulses overlap, the sequence remains the same, i.e., 1,0,−1.

Another advantage of a PRML channel is the use of the so-called Maximum-Likelihood (ML) detector, which is known also as a sequence detector, or a Viterbi detector in the field of digital communication. The ML detector stores the received sequences of samples and finds input data which are the nearest to the data received. Since such a method is based on an optimized selection of data in accordance with the sample sequence, it will improve the signal-to-noise ratio and reduce the channel error rate. The above-mentioned feature of the PRML method makes it highly advantageous for a high-density magnetic recording channel.

Typical Block Diagram of PRML—FIG. 2

A typical block diagram of a PRML channel is shown in FIG. 2. The system consists of the following sequentially connected units: an amplifier 20 which receives input signals, an equalizer 22, an analog-to-digital converter (ADC) 24, and a detector 26, which in some cases may be connected to ADC 24 through a digital equalizer 28. The output of the ADC is connected to a timing recovery unit 30 for synchronizing ADC and to a gain recovery unit 32. The output of timing recovery unit 30 is fed back to the ADC, while the output of gain recovery unit 32 is fed back to amplifier 20.

Equalizer 22 modifies the shape of the recorded signal to a standard waveform acceptable for processing. ADC 24 samples the signals and converts them into digital form. From the output of ADC 24, the digitized signals are sent, via optional digital equalizer 28 which provides additional correction of the sample values, to detector 26. The same signal which is present at the output of the ADC is sent through a feedback loop to timing recovery unit 30 and to gain recovery unit 32. Timing recovery unit 30 controls the clock pulses which are used for timing the operation of the ADC. On the other hand, the feedback loop from gain recovery unit 32 to amplifier 20 adjusts the gain of amplifier 20 to the correct value.

In the above system, detector 26 receives at its input the above-mentioned PRML sequences of signals, which consist only of combinations of 0, +1, and −1.

Detector 26 detects the signals in accordance with the above-described maximum likelihood principle and produces the resulting data on its output. This is a particular set of data which is to have its error analyzed.

A general description of the application of the PRML principles for magnetic recording channels can be found in the following references: R. D. Cideciyan, F. Dolvio, R. Hermann, et al. "A PRML system for Digital Magnetic Recording"—*IEEE Journ. Selected Areas in Communications*, vol. 10, No. 1, pp. 38–56, 1992; R. W. Wood and D. A. Petersen, "Viterbi Detection of Class IV Partial Response on a Magnetic Recording Channel"—*IEEE Trans. Communications*, vol. 34, No. 5, pp. 454–461, 1986; D. C. Palmer and J. D. Coker, "Media Design Considerations for a PRML Channel"—*IEEE Trans. Magnetics*, Vol. 29, No. 1, pp. 189–194, 1993.

The first commercially-available PRML disk drive was produced by IBM, and since that time, numerous and diverse architectures for future PRML products are being pursued by the electronics industry.

Existing Methods for Measuring Errors with PRML Channel

Having described the principle of the PRML method, we can now analyze the existing methods where a PRML channel is used for measuring errors, and, in particular an error rate.

Basically, the following four methods are known for the above purposes:

1. An approximate standard deviation of noise in the PRML channel is found. An error rate corresponding to the measured noise deviation can be estimated from theoretical calculations which can be found in the above three references. These calculations, however, are rough approximations of the realistic situation, because: a) they are based on a Gaussian noise assumption, which is not representative for a realistic magnetic read channel; b) they ignore non-idealities of the PRML system components (equalizer, timing, and gain loops); c) they ignore channel non-linearities (non-linear transition shift, timing asymmetry, and others).

2. System performance is evaluated by counting direct error rate on the system output, using a known input pattern of data which has been written to the disk, and an artificially created white noise mixed to the channel. (See P. Ziperovich "Performance Degradation of PRML Channel Due to Non-linear Distortions"—*IEEE Trans. Magnetics*, vol. 27, No. 6, pp. 4825–4827, 1991). Since this method uses artificial noise source in the channel's input, it ignores the realistic mixing of media and electronics noise which occurs in the system. Therefore, this method cannot result in correct evaluation.

3. System performance is evaluated by counting errors on the system output using a known input pattern of data which has been written to the disk and shifting the readhead position off the track center for creating an artificial error. This method is limited with respect to the estimation of the off-track system performance and thus does not characterize the overall performance of the channel (T. Howell, D. P. McCown, et al., "Error Rate Performance of Experimental Gigabit per Square Inch Recording Components" —*IEEE Trans. Magnetics*, vol. 26, No. 5, pp. 2298–2302, 1990).

4. Instead of measuring an error rate, the channel quality is estimated based on so-called amplitude margin histograms. While histograms of sample values distribution have been widely used for practical purposes in the prior art (see, for example, P. Ziperovich, 1991, supra), the approach described here is different in that it is based on an accumulated histogram of error values. This method is disclosed in U.S. Pat. No. 5,121,263, June, 1992, to G. Kerwin, et al. From the output of the ADC of the above-described PRML channel, the signals are compared with their expected (nearest nominal) values, and the differences are accumulated in the form of a histogram. This histogram is then used for qualitative evaluation of the channel performance. For example, if a histogram of error values is represented by a narrow sharp peak centered around the zero position, the channel quality is considered to be good. On the contrary, if the histogram of error values is characterized by a wide, flat distribution, the channel quality is considered to be poor.

Although the last described method qualitatively characterizes the system's overall quality, it does not give a quantitative estimation of the system's performance. As is argued in a number of recent publications (see, for example R. Wood "Turbo-PRML: A Compromise EPRML Detector", *IEEE Trans. Magnetics*, vol. 29, No. 6, pp. 4018–4020, 1993, and X. Che, L. C. Barbosa and N. Bertram "PRML Performance Estimation Considering Medium Noise Down Track Correlations" —*IEEE Trans, Magnetics*, vol. 29, No. 6, pp. 4062–4064, 1993), noise in magnetic recording process can be correlated with the data. While this local signal-dependent noise correlation is negligible for currently used magnetic heads, it may become important in future for new types of magnetic heads, usually referred to as magneto resistive heads. These noise correlations are ignored in Kerwin et al. approach. The Kerwin et al. approach has several other serious drawbacks, which were discussed in the above Taratorin and Tesler application.

Thus, none of the existing methods and apparatuses can measure an actual error rate, or evaluate an actual performance of the PRML channel, without the use of complicated and time-consuming procedures.

These problems are partially solved by the system described in the above Taratorin application. The apparatus disclosed in this application is capable of rapidly measuring the error rate of a channel, taking into consideration all intrinsic system non-idealities and without introducing artificial factors into the measurement process.

However, practical realization of this apparatus requires that a special processing unit be incorporated into the PRML channels. Commercially available PRML channels are usually produced in the form of an integrated circuit chip, i.e., where there is no possibility of incorporating additional processing units into the existing device. This makes this apparatus unsuitable for testing commercially available PRML channels, especially for some specific applications such as the manufacture of disk drive components.

A practical solution of the above problems was proposed in the above Taratorin and Tesler application. This is based upon analysis of the partial histograms of samples which provides an estimate of the error rate of a PRML channel. Although the Taratorin and Tesler method is simple and convenient in use, it may result in overestimation of the actual error rate of a system, e.g. in the presence of correlated and signal-dependent noises which may result due to interference of magnetic signals from adjacent track (so called inter-track interference).

Objects and Advantages of the Invention

Therefore several objects of the invention are to provide an improved method and an apparatus for the measurement of the error rate of a PRML channel; to provide such an apparatus and method which employs histogram technology, which is suitable for high-density records, which is insensitive to pulse overlapping, which is based on a realistic magnetic read channel, taking into account the non-idealities of the PRML system components, which provides quantitative evaluation of the PRML channel performance, and which can evaluate errors without the use of artificially created noise, or the displacement of the head from its correct position, which takes into account the asymmetry and the different contributions of the partial errors corresponding to different partial response samples, which does not introduce errors into accumulated error distribution using threshold detection during the histogram accumulation process, which closely simulates performance of a realistic maximum likelihood detector, and which is insensitive to local noise correlation and signal-dependent noises caused by inter-track interference in the magnetic recording process.

Another object is to simplify the error-rate evaluation procedure and make it possible to obtain the estimation results in a short time.

Other advantages and features of the invention will become apparent from a consideration of the ensuing description and drawing.

Figure 1:
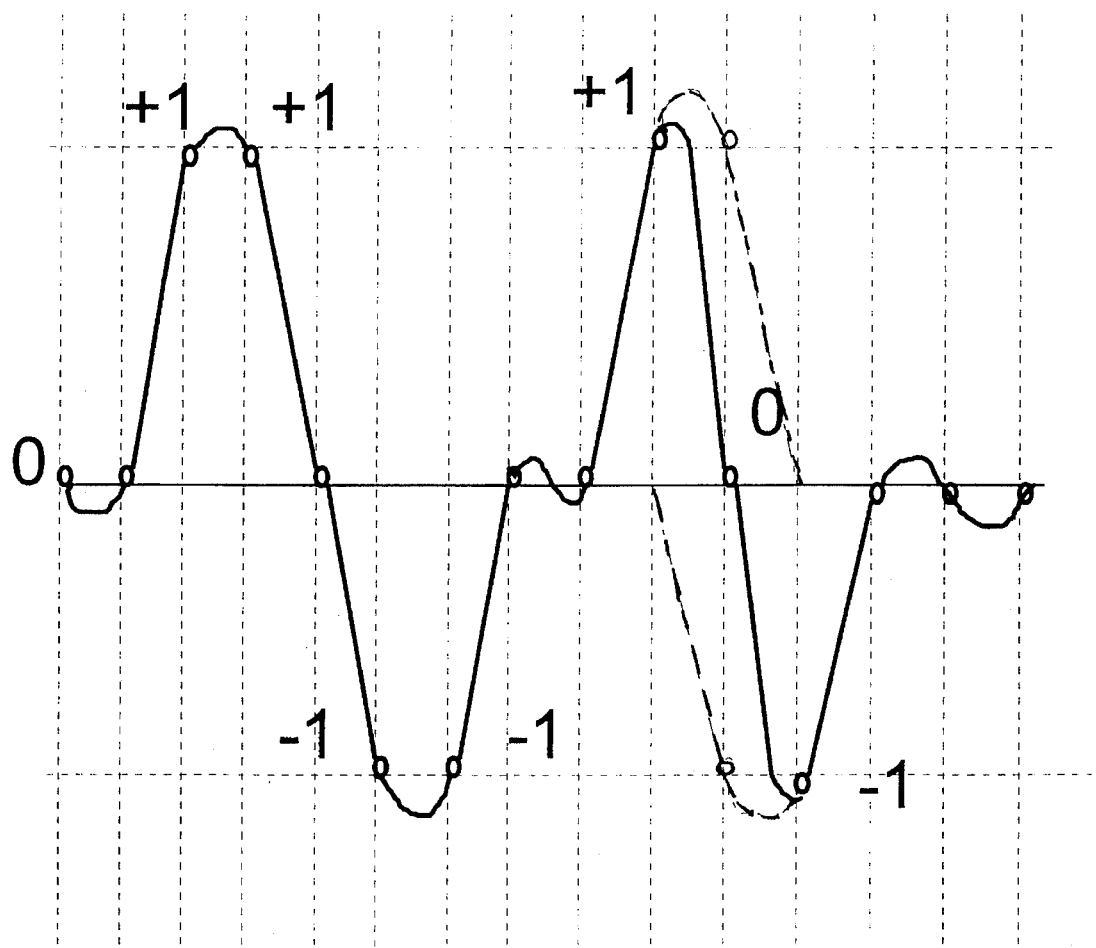
FIG. 1 is an example of a sinusoidal waveform with a sequence of sample points in accordance with a conventional PRML method.

REFERENCE NUMERALS USED IN THE DRAWINGS AND DESCRIPTION 20, 50—amplifiers
22, 52—equalizers
24, 54—analog/digital converters
26—maximum likelihood detector
28, 56—optional digital equalizers
30, 62—timing recovery units
32, 64—gain recovery units
60—sequence detector
60A—output of a PRML channel
66—subtraction unit
68—noise processing unit
70—histogrammer
72—reference pattern generator
80—address unit
82—RAM memory
84—incrementor
90—multiplier
92—programmable digital delay line
94—adder

DETAILED DESCRIPTION OF THE INVENTION

Figure 3:
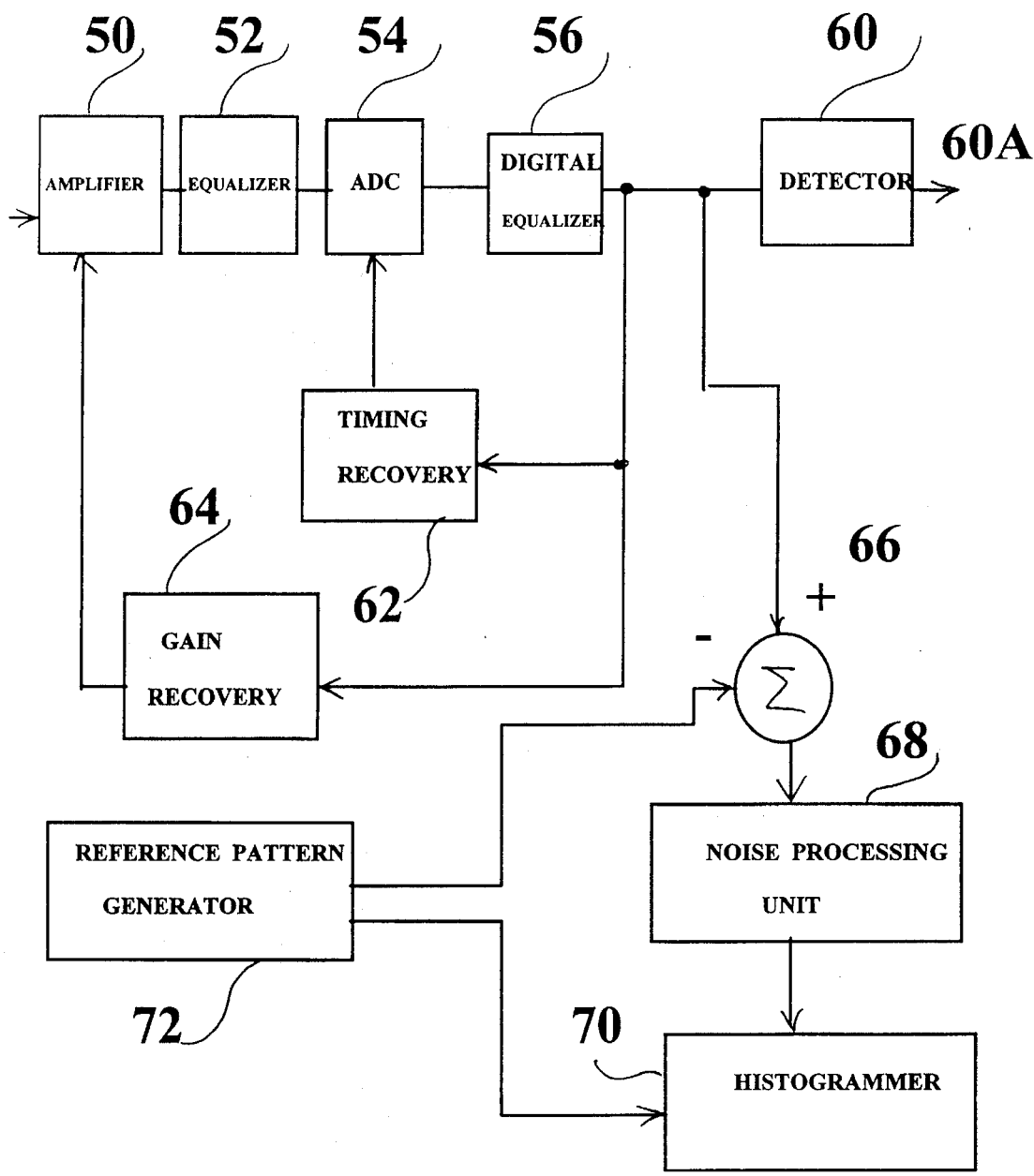
FIG. 3 is a block diagram of a PRML channel of the present invention.

Block Diagram of the System—FIG. 3

As has been mentioned, a PRML channel is a part of a disk drive unit which is used for data detection. Also the correct measurement of an error rate of a data storage unit, such as a hard disk, is an extremely important step, e.g., for characterizing the performance and quality control of the unit.

A schematic block diagram of a PRML system of the present invention for measuring an error rate of a data storage unit is shown in FIG. 3. The system consists of the following units connected in series: an amplifier 50 which receives input signals, e.g., from a read head (not shown), an equalizer 52, an analog-to-digital converter (hereinafter referred to as an ADC) 54, an optional digital equalizer 56, and a sequence detector 60. An output of digital equalizer 56 is connected to a timing recovery unit 62 and to a gain recovery unit 64. Timing recovery unit 62 has a feedback connection to the ADC, while gain recovery unit 64 has a feedback connection to amplifier 50. The output of digital equalizer 56 is also connected to one input of a subtraction unit 66. The second input of this unit is connected to the output of a reference pattern generator 72. An output of subtraction unit 66 is connected to the input of a noise processing unit 68. The output of this unit in turn is connected to the input of a histogrammer 70. Reference pattern generator 72 also provides control signals to the input of histogrammer 70.

Figure 2:
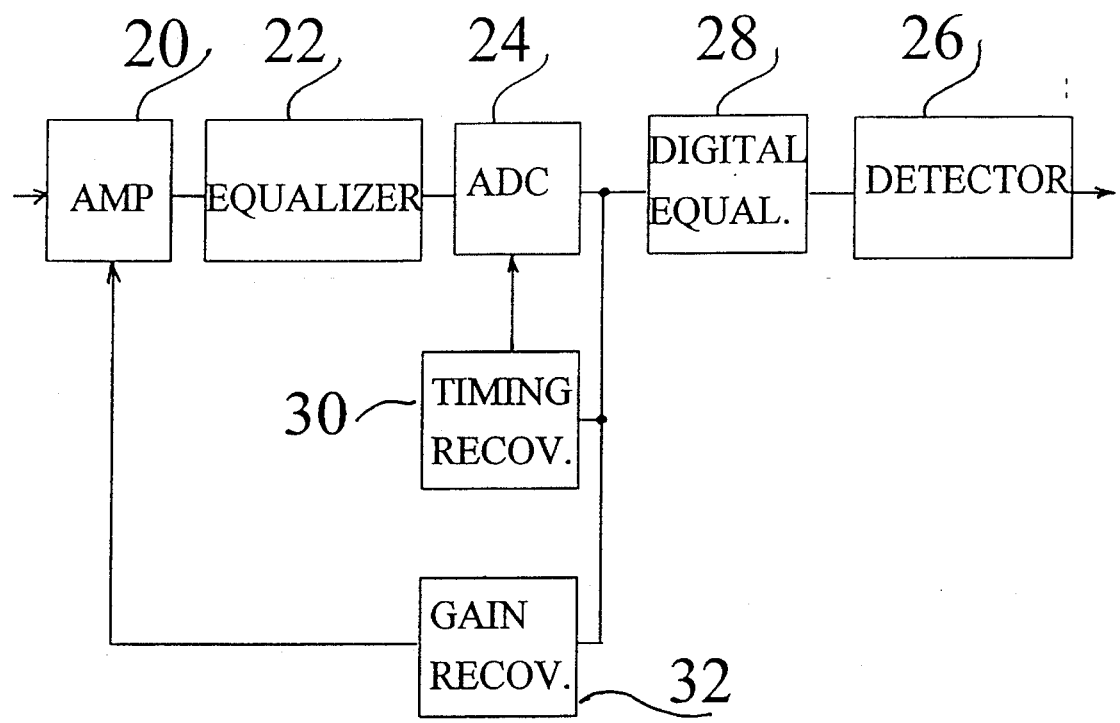
FIG. 2 a block diagram of a typical prior-art PRML channel.

The PRML channel shown in FIG. 3 differs from the conventional PRML channel of FIG. 2 and these distinguishing features impart to the PRML channel unexpected and advantageous properties, and allow measurements of error rates to an extent unattainable with conventional PRML channels.

All units of the system of FIG. 3, except for noise processing unit 68 and histogrammer 70, are known and are produced by a number of companies. IBM Storage System Products Division (IBM Rochester, Mich. 55901) produces IBM 0681 PRML disk drive which includes all of the standard units of the PRML channel. Cirrus Logic Inc. (3100 W. Warren Av., Fremont, Calif. 94538) produces CL-SH 3300 and S1-SH 4400 chip sets for a PRML read channels, which include all of the above units. A functionally similar set of chips (PCA842, PCA845, PCA854, PCA6080) for PRML channel is produced by GEC Plessey Semiconductors (1735 Technology Drive, San Jose, Calif. 95110).

Reference pattern generator 72 is assumed to be a standard part of a disk testing equipment and is produced by a number of companies as an integrated part of their products. Similar device is produced by Guzik Technical Enterprises (4620 Fortran Dr. San Jose Calif., 95134) for RWA 1001 Guzik Tester.

The construction of noise processing unit 68 is detailed in FIG. 4, which will be described later. The construction of histogrammer 70 is detailed in FIG. 5, which will also be described later. Since the construction and application of the noise processing unit and of the histogrammer will be better understood after the description of the operation of the system in general, such an operation will be now described.

General Operation of the PRML System

When the measurement of an error rate of a data storage unit is in progress, signals are transmitted from a read head of a tester (not shown) to amplifier 50. The latter amplifies the signal and sends it to equalizer 52 which modifies the shape of the input signal so as to obtain a standard waveform acceptable for processing. Equalizer 52 sends its output signal to ADC 54, which samples the analog signals and converts them into digital samples. If necessary, the digital samples are sent from the output of ADC 54 to a digital equalizer 56, which provides additional shaping of the sample values.

One of the most widely used schemes of data encoding for a PRML channel is known as a PR-IV scheme. In this scheme, the ideal samples on the ADC output constitute only their nominal values 0, −1, +1, while for another scheme, which is known as a EPR4 scheme, these samples may take any of the following values: 0, +0.5, +1, −0.5, −1, etc. A description of different PR schemes used in magnetic recording is found in the paper of H. K. Thapar and A. M. Patel, "A Class of Partial Response Systems for Increasing Storage Density in Magnetic Recording"—IEEE Trans. Magnetics, vol. 23, No. 5, pp. 3666–3668, 1987.

The sample values are then transmitted from digital equalizer 56 to sequence detector 60, which detects the signal on the principle of maximum-likelihood detection, the definition of which has been given earlier.

Digital samples from the output of digital equalizer 56 are sent to the input of subtraction unit 66 synchronously with reference samples which are sent from the output of reference pattern generator 72 to another input of subtraction unit 66. These reference samples correspond to the a priori known correct value of the current digital sample. Therefore, the output of subtraction unit 66 represents a stream of noise sample values corresponding to each signal sample value.

The noise values from the output of subtraction unit 66 are sent to the input of noise processing unit 68 which forms a particular linear combination of the noise samples, determined by a set of noise processing unit coefficients, which will be described in detail later. It is assumed that these coefficients are programmable from an external control device such as a computer (not shown). An output of the noise processing unit 68 is sent to the input of histogrammer 70. Histogrammer 70 also receives control signals from reference pattern generator 72.

In the measurement process, a particular set of coefficients is loaded into noise processing unit and then digital data are read by the PRML channel and passed through the noise processing unit 68 to the input of histogrammer 70. Typically several sets of coefficients of the noise processing unit 68 must be checked for a particular type of PRML.

Histogrammer 70 segregates stream of samples on the output of noise processing unit in accordance with the stream of control signals coming from reference pattern generator 72 and accumulates distributions of segregated samples on the output of noise processing unit, producing I independent histograms, where I is a number of noise processing unit coefficient sets appropriate for the particular partial response scheme used.

From the output of digital equalizer 56, the signal is also sent to timing recovery unit 62, and to gain recovery unit 64. Based on the signals received through the feedback connection to ADC 54, timing recovery unit 62 restores a system clock, and thus maintains the operation of ADC 54 in correct phase with sampling. At the same time, gain recovery unit 64 provides gain adjustments for amplifier 50.

The above description concerns a flow of data from the read head to sequence detector 60. The following description will provide more detailed information on the principle of error rate measurements.

In the context of the present description, an output 60A (FIG. 4) of sequence detector 60 is assumed as the final output of the entire PRML channel. From output 60A a signal is sent to a computer or any other data processing unit (not shown).

Figure 4:
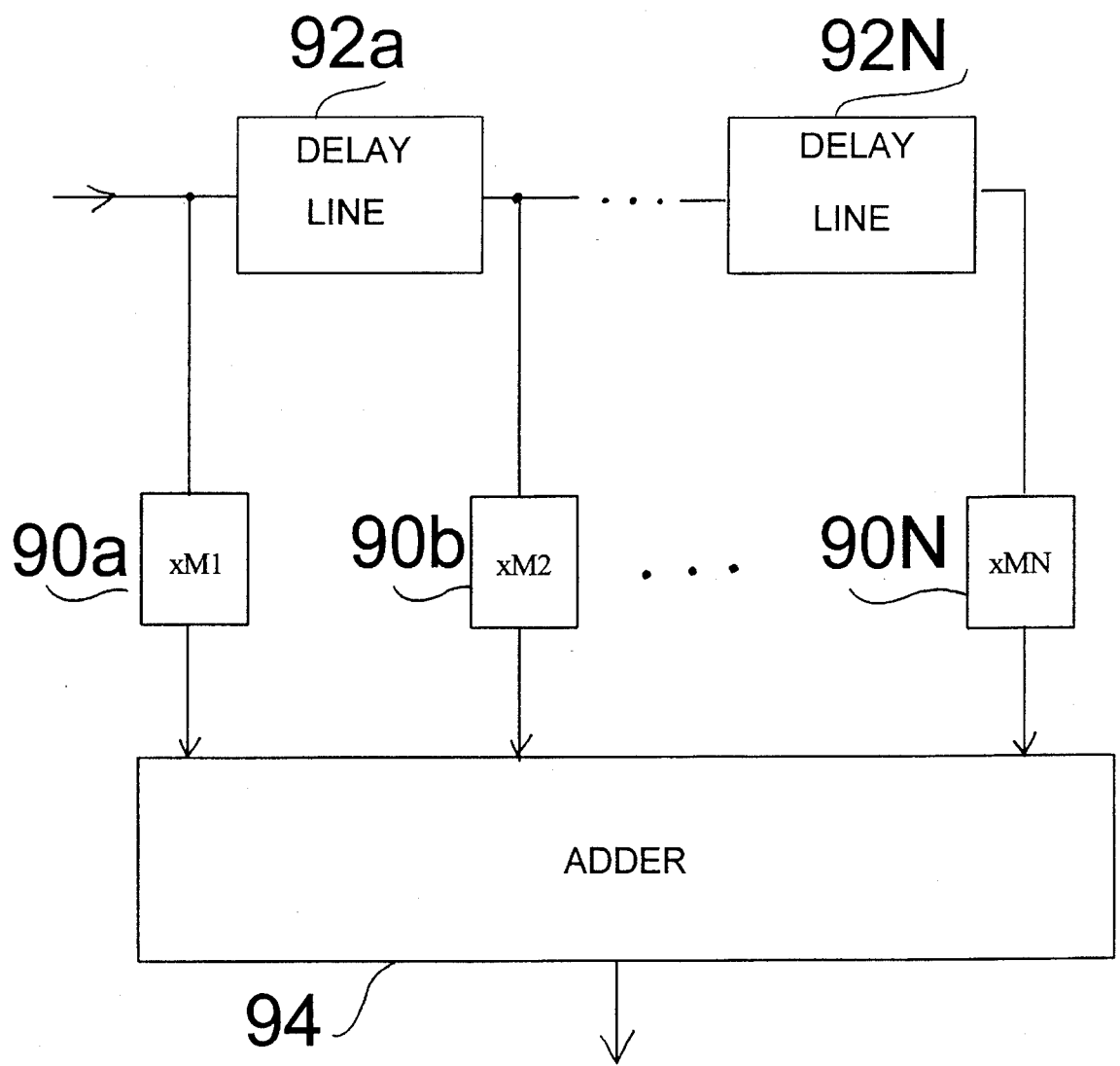
FIG. 4 is a block diagram of noise processing unit of the PRML channel of FIG. 3.

Block Diagram and Operation of Noise Processing unit—FIG. 4

The structure of a noise processing unit is shown in FIG. 4 in a block diagram form. It consists of N similar chains, each consisting of a multiplier 90 (i.e., 90a, 90b, . . . , 90N respectively) and a digital delay line 92 (i.e., 92a, 92b, . . .,  92N respectively). The signal from the output of each delay line 92 is passed through a corresponding multiplier 90. The outputs of all multipliers are connected to the inputs of an adder 94. An output of adder 94 constitutes output of the entire noise processing unit. The total number of these chains is in general not limited and is determined by the maximum length of error event for a particular type of a PRML and ML detector.

When a stream of digital samples n(k) is coming to the noise processing unit input, they are delayed in programmable digital delay lines j=1 . . . , N-1 (92a, 92b, . . . ,92N) to a programmable number l(j) of clock periods. A delayed signal from the output of each delay line is represented as n(k-l(j)) and is then multiplied to a pre-programmed coefficient m(j) in multipliers 90a, 90b, . . . ,90N. Therefore, a signal from the output of adder 94 is represented by:

$$d(k) = \sum_{j=1}^{N} m(j)n(k - l(j))$$

These samples appear on the output of adder 94 for every clock period and are sent to the input of histogrammer 70.

Figure 5:
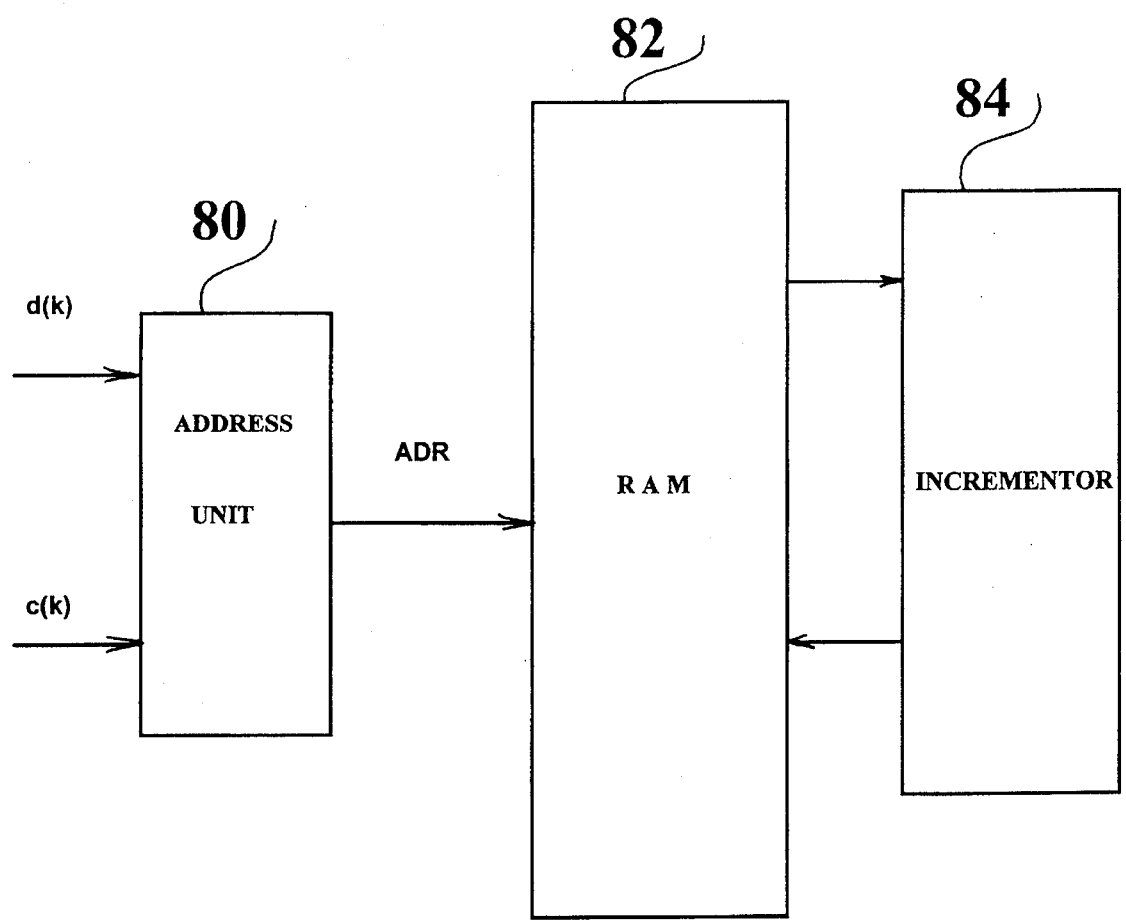
FIG. 5 is a block diagram of a histogrammer of the PRML channel of FIG. 3.

Block Diagram and Operation of the Histogrammer—FIG. 5

The structure of histogrammer 70 is shown in FIG. 5 in a block-diagram form. It consists of an address unit 80, a RAM (random-access or read-and-write memory) 82, and an incrementor 84.

Before starting a histogram accumulation procedure, the content of RAM 82 is set to zero.

During a histogram accumulation process, a stream of noise samples n(k) from the output of subtraction unit 66 and corresponding control value c(k) are simultaneously applied to the input of address unit 80. Address unit 80 produces a combined address consisting of the digital value of the current noise sample n(k) and the corresponding control value c(k).

The control value contains information which is necessary to segregate output of the noise processing unit. A control value incorporates a classification value for current set of the coefficients of the noise processing unit and, optionally, may carry information about validity of above-mentioned set of coefficients for each particular bit position in the reference pattern.

The classification value of coefficients of the noise processing unit is necessary to distinguish between the different sets of coefficients. If several sets of coefficients are used in the noise processing unit, the first set is assigned a classification value of 0, the second set is assigned a classification value of 1, etc.

The meaning of the validity value can be better understood from the following consideration. In general, for different types of PRML and different encoding schemes used in magnetic recording, not all positions in the reference pattern are valid for a specific type of error which may occur in the ML detector. For example, if a particular set of coefficients is used in the noise processing unit, the output of the unit should be enabled only at specific time instants, corresponding to a priori calculated positions in the reference pattern. Thus, validity value is assigned either "0" (disabled) or "1" (enabled) for every sample in the reference pattern.

An example of such an assignment is given below. The first line represents number of clock points in which samples are taken. The second line is an input sequence of positive and negative transitions written to a magnetic recording device. The third line represents a resulting sequence of samples at the input of a ML detector for PR4 PRML method. The set of coefficients of the noise processing unit is assumed to be $\{-1, 0, 1\}$. The fourth line contains validity values for each clock point.

A combined address is formed in address unit 80. This address is a location in RAM 82, so that each control value corresponds to several specific bits of the address. This means that samples corresponding to different classification values will always be accumulated in different memory locations.

When a particular address ADR is applied to the input of the histogrammer, the memory content of this address M(ADR) is incremented by 1 by incrementor 84, i.e. M(ADR)= M(ADR)+1. In other words, the corresponding histogram value is increased by 1. In this way, after a sufficient number of samples has been processed, the content of RAM 82 will represent N independent histograms of processed noise values. The content of this memory can be read into a host computer or a special processor (not shown) for subsequent processing and analysis.

Thus, it has been shown that the distinct feature of histogrammer 70 is the provision of independent histogram accumulation for each particular combination of programmable noise processing unit coefficients. This is achieved by supplying control value to the histogrammer's input and by forming a combined address in RAM 82.

Figure 6A:
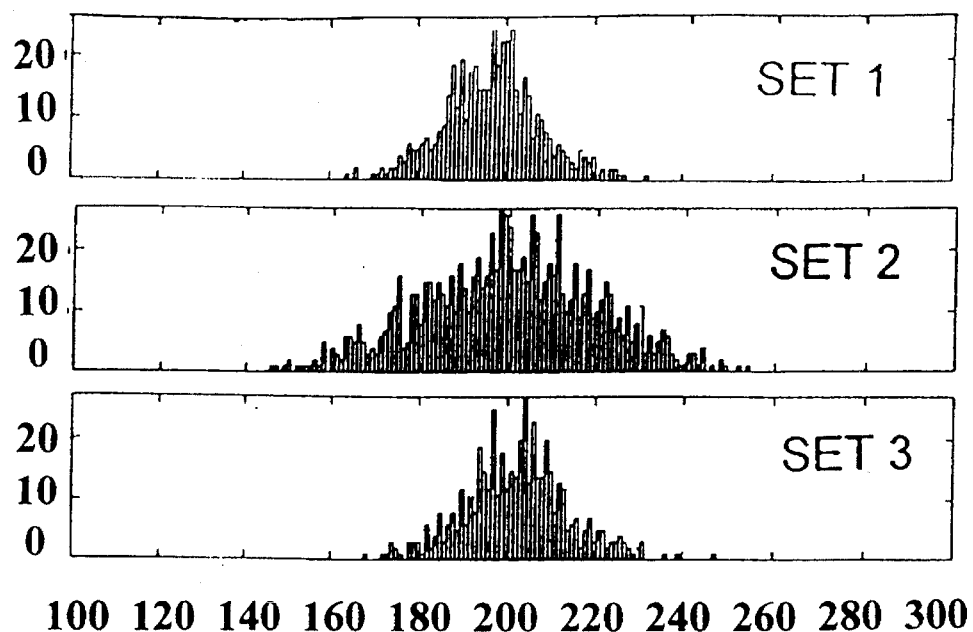
FIG. 6 is plot showing an example of measuring the error rate of a system, where plot "a" shows three original processed noise histograms on the noise processing unit output for three different sets of coefficients of the unit, and plot "b" shows the results of prediction of the error rate for the PRML system.
Figure 6B:
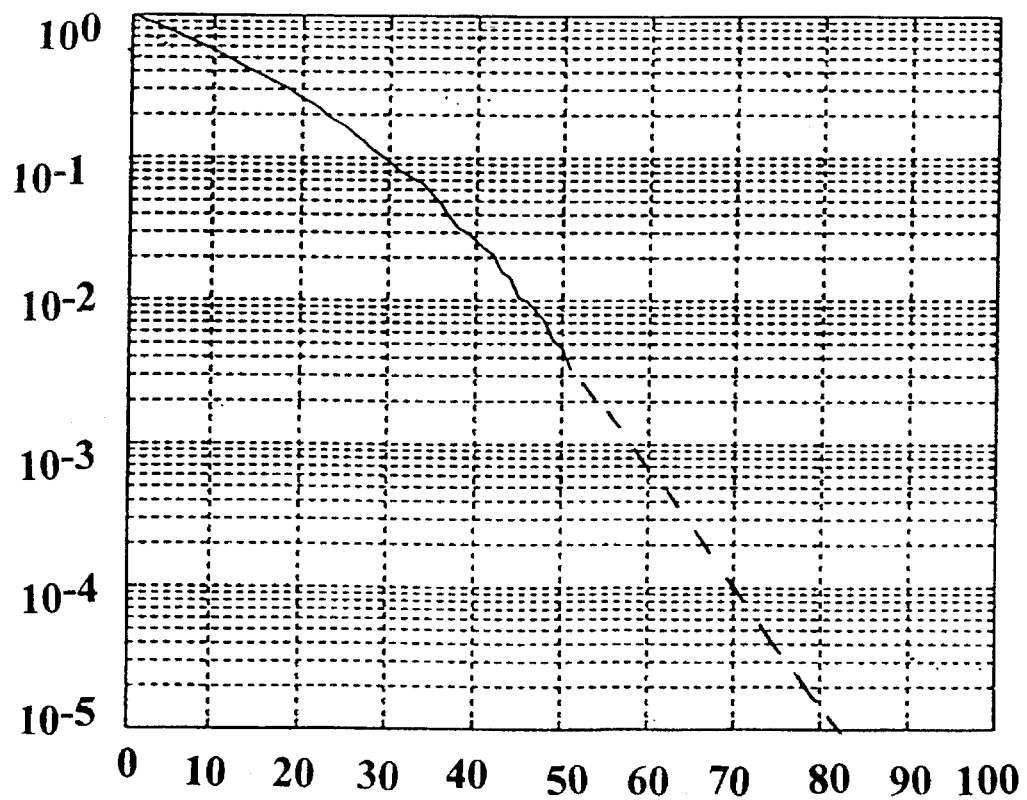

Processing of Histogrammer Output Data—FIG. 6

The method for calculation of the error rate for the partial response signals based on processed noise samples will now be explained.

For an ideal PR system, output samples of digital equalizer 56 constitute noise-free samples equal to the reference samples: y(k)=r(k), where k is a number of the clock count. In a practical situation, however, such a set of samples is distorted by a number of system non-idealities. The distortions are usually caused by media and electronic noise, as well as by non-linearities of the channel, and noise in the timing and gain recovery loops, etc. As a result, samples y(k) deviate from their nominal values.

The maximum likelihood detector stores a sequence of samples and predicts the most probable sample sequence. This prediction requires a complicated real-time search algorithm and results in an improved detection quality.

As is well known from prior art (see R. Wood, supra), an arbitrary maximum likelihood detector may produce an error when a particular noise pattern in the input data transforms the input sample sequence into another sample sequence which is permissible for the particular type of PRML and code. This can be illustrated by the following simple considerations.

Assume that the received sequence of samples be y(k)= r(k)+n(k) and A represents a minimum step between partial response levels, also referenced to as a margin separation distance (MSD). Nominal values of the MSD are: A=1 for PR4, A=½ for EPR4, A=⅓ for E2PR4. If an error is made during the detection process, a "wrong" sequence of samples b(k) is detected. Note that b(k) is permissible, i.e., constitutes one of the possible sequences for the particular type of PRML. An arbitrary permissible sequence b(k) can be represented as b(k)=r(k)+m(k)A, where m(k) is the number of levels between r(k) and b(k). A typical error event has some finite length of N samples. An error occurs when the squared distance between received and correct sequences of samples is greater than the distance between the received and "wrong" sequences:

$$\sum_{k=1}^{N} [y(k) - r(k)]^2 > \sum_{k=1}^{N} [b(k) - y(k)]^2 \quad (1)$$

The left side of Eq.(1) is the sum of squared noise samples. By substituting b(k)=r(k)+m(k)A and y(k)=r(k)+ n(k) to the right side of Eq.(1), we obtain:

| | Clock points: | | | | | | | | | | | | | | | | | | | | | |
|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| Input data: | −1 | 0 | 1 | 0 | 0 | −1 | 1 | 0 | −1 | 0 | 0 | 0 | 1 | 0 | −1 | 0 | 0 | 1 | 0 | −1 | 0 | 0 |
| Samples: | −1 | −1 | 1 | 1 | 0 | −1 | 0 | 1 | −1 | −1 | 0 | 0 | 1 | 1 | −1 | −1 | 0 | 1 | 1 | −1 | −1 | 0 |
| Validity: | 0 | 0 | 1 | 1 | 0 | 0 | 0 | 1 | 0 | 0 | 1 | 1 | 1 | 1 | 0 | 0 | 1 | 1 | 1 | 0 | 0 | 1 |

$$\sum_{k=1}^{N} [n(k)]^2 > \sum_{k=1}^{N} [m(k)A - n(k)]^2 \quad (2)$$

By opening brackets in Eq.(2) we obtain the following condition for the occurrence of an error in the ML detector:

$$d = \sum_{k=1}^{N} m(k)n(k) > A \frac{\sum_{k=1}^{N} [m(k)]^2}{2} \quad (3)$$

Thus, an error on the output of the ML detector occurs if some specific linear combination d of noise samples, given by the left side of Eq.(3), exceeds a threshold given by the right side of Eq.(3). The right side of Eq.(3) is also called a distance of the error event.

Obviously, in order to check the data for different types of errors, all possible sets of coefficients m(k) must be found. To obtain all of the possible sequences of m(k), first it is necessary to find all sequences possible at the input of the maximum likelihood detector.

When input digital data i (k), consisting of a sequence of zeroes and ones, is written on the magnetic recording device, the recorded information is distorted by the properties of magnetic media and heads. As is well known from prior art (see R. D. Cideciyan et al., supra), the data samples r(k) on a disk results from the following summation of a digital data with a pulse shape:

$$r(k) = \sum_{k=1}^{N} K(j)i(k+j-N)$$

where K(j) is approximation of the pulse shape, and i(k) is input digital data. Each i(k) may be equal to 0, +1 or −1. An additional limitation is the change of the written pulse polarity: each positive transition written on magnetic media is followed by negative transition, i.e. "+1" follows "−1" and vice versa.

The last equation can be rewritten in the following form:

$$r(k) = H + K(N)i(k), \text{ where } H = \sum_{j=1}^{N-1} K(j)i(K+j-N)$$

As seen, every next possible value of r(k) depends both on next digital data i(k) and on previous signal. Namely, r(k) may have only two possible values:

$r(k) = H$ (if $i(k)=0$)

$r(k) = H \pm K(N)$ (if $i(k)=\pm 1$)

where an actual sign of non-zero i(k) depends on previous pulse polarity.

To distinguish between correct and incorrect input values, a ML detector must keep the value of H and the polarity of the last pulse. This information defines the current state of the ML-detector. For each correct input value, the ML-detector produces a corresponding output value and changes its state. A new state depends both upon the input value and the previous state. Thus, each ML-detector may be represented as a so-called "state machine". Different PRML schemes may use different pulse sampling and shapes. This results in different values of K(k) and different state machines. Several examples of pulse shaping coefficients for most popular types of PRML are given below:

PR4: K(1)=1, K(2)=1

EPR4: K(1)=½, K(2)=1, K(3)=½

E2PR4: K(1)=⅓, K(2)=1, K(3)=1, K(4)=⅓

As an example, we demonstrate how to build a state machine for PR4. We have:

$H = i(k-1)$, $r(k) = H \pm i(k)$

There are two possible values for H and (independently) two possible polarities of the last pulse, which will result in four possible states. Let us designate them "0 +", "0−", "1+", "1−", where digits mean the previous decoded data i(−1) and the trailing signs designate polarities of the last pulse.

Starting from the "0+" state, i(k) is decoded as −1 if r(k)=−1 and after that the state becomes "1−". We also can decode i(k) equal to 0 if r(k)=0 and after that the state remains the same. Value i(k)=1 is forbidden because the previous pulse had positive polarity. In order to build a state machine similar calculations must be repeated for all of the possible states. The result for the illustrated case is shown below in a matrix form:

|        | TO:   |       |       |       |
|--------|-------|-------|-------|-------|
| FROM:  | "0+"  | "1+"  | "0−"  | "1−"  |
| "0+"   | 0     |       |       | −1    |
| "1+"   | 1     |       |       | 0     |
| "0−"   |       | 1     | 0     |       |
| "1−"   |       | 0     | −1    |       |

Each cell of the matrix contains a value of r(k) which results in transition between appropriate states. Empty cells mean that a corresponding transition can not occur. The transition between any two given states can have length equal to 2, consisting of two values of r(k). To calculate these sequences, the above matrix should be squared. For sequences, describing transitions of length 3, a cube of the initial matrix is calculated, etc. For example, for sequences of length 3, the matrix will look as follows:

|       | TO:  |   |   |   |    |    |    |    |    |    |   |    |
|-------|------|---|---|---|----|----|----|----|----|----|---|----|
| FROM: | "0+" |   |   |   | "1+" |   |   | "0−" |   |   | "1−" |   |
| "0+"  | 0    | 0 | 0 | 0 | −1 | 0  | 0  | −1 | −1 | 0  | 0 | −1 |
|       | −1   | 0 | 1 | −1| −1 | 1  | −1 | −1 | 0  | −1 | 0 | 0  |
| "1+"  | 1    | 0 | 0 | 1 | −1 | −1 | 1  | −1 | −1 | 1  | 0 | −1 |
|       | 0    | 0 | 1 | 0 | −1 | 0  | 0  | −1 | 0  | 0  | 0 | 0  |
| "0−"  | 1    | 1 | 0 | 1 | 0  | 0  | 1  | 0  | −1 | 1  | 1 | −1 |
|       | 0    | 1 | 1 | 0 | 0  | 1  | 0  | 0  | 0  | 0  | 1 | 0  |
| "1−"  | 0    | 1 | 0 | 0 | 0  | 0  | 0  | 0  | −1 | 0  | 1 | −1 |
|       | −1   | 1 | 1 | −1| 0  | 1  | −1 | 0  | 0  | −1 | 1 | 0  |

There are two possible three-element sequences between each two states. In each cell the lower sequence may be obtained from the upper one by adding the same sequence: {−1,0,1}. This gives us the first sequence m(k) and an appropriate linear combination from Eq. (3).

The procedure illustrated above can be repeated for different lengths of error events, different types of PRML, and different codes. Therefore, a list of coefficients m(k) for each type of PRML and coding constraints can be easily generated. For example, for a PR4 method with the so-called 8/9 rate code (see R. Wood, supra), the most probable error event combinations (and the equivalent set of m(k) coefficients) are the following: {1,0,−1}, {1,0,0,0,−1}, {1,0,0,0,0,0,−1}, etc. For EPR4 with 8/9 rate code, the most probable combinations are: {1,1,−1,−1}, {1,1,0,0,−1,−1}, {1,0,−1,1,−,−1}, {1,0,−1,0,−1,0,1}, etc. For E2PR4 method with 1/7 code, the most probable combination of m(k) is {1,2,0,−2,−1} and less probable is {1,2,0,−1,1,−,−2,−1}. The following most probable sequences have been generated for different encoding schemes and types of PRML: {1,0,−1{; }1,0,0,0,−1}; {1,0,0,0,0,0,−1}; {1,0,0,0,0,0,0,−1}; {1,1,−,−1}; {1,−1,−1,1}; {1,−1,−1,0,0,1};{1,−1,−1,1,−1}; {1,1,−1,−1}; {1,1,0,0,−1,−1}; {1,1,0,0,0,0,−1,−1}; {1,1,0,0,0,0,0,0,−1,−1}; {1,0,−1,1,0,−1};{1,0,−1,0,−1,0,1}; {1,0,−1,0,0,1,0,−1}; {1,0,−2,0,1};{1,1,−1,0,1,−1,−1},{1,1,0,−1,−1,1,1,0,−1}; {1,1,−1,0,0,1−1,−1}; {1,1,−1,−1,−1,−1,1,1,};{1,1,−1,−1,0,1,1,−1,−1}; {1,2,0,−2,−1}; {1,2,0,−1,1,0,−2,−1}.

To explain histogram-based measurement of the error rate of the PRML channel, assume that a set of histograms Hi(d) is accumulated, where i is the number of the particular combination of coefficients in the noise processing unit. It is assumed that histograms are segregated according to control values. For each set of coefficients, the right side of Eq.(3) equals to $A*T_i$, where $T_i$ is a squared sum of the noise processing unit coefficients. If $d > A*T_i$ an error event occurs. Each of the particular error events generates a different number $M_i$ of bit errors on the output of the ML detector. For example, for a combination of m(k)={1,0,−1} in a PR4 system $M_i$ is equal to 2, while for coefficients m(k)={1, 0, 0, 0,−1}, $M_i$ is equal to 4 (see R. Wood, supra). For each set of noise processing unit coefficients m(k) and for each value of the margin separation distance A, a number of errors is calculated as $$E_i(A) = M_i \sum_{d_i=AT_i}^{DMAX} H(d_i) \quad (4)$$

Here DMAX is the maximum value of the noise processing unit output. As seen from Eq.(4), for each set of noise processing unit coefficients, a number of errors depending on the particular value of MSD can be calculated based on the partial histograms of the noise- sample difference. Therefore, a total number of errors on the output of the PRML channel can be calculated as:

$$E(A) = \sum_{i=1}^{I} E_i(A) \quad (5)$$

In this way, calculating dependence of E(A) for different values of A, we obtain a dependence of a total number of errors on the margin separation distance. This dependence is calculated for values of A smaller than nominal and then extrapolated, thus predicting an error rate of a PRML channel. Example of such a plot is shown in FIG. 6.

Note that several modifications of the above-described method for error rate calculation based on the histograms of processed noise samples can be proposed. For example, if the validity information about the reference pattern is not used, probability of each particular type of error determined by a set of noise processing unit coefficients can be calculated and taken into consideration when calculating sum of errors given by Eq. (5).

SUMMARY, RAMIFICATIONS, AND SCOPE

Thus, it has been shown that the present method and apparatus for the measurement of the error rate of a PRML channel is suitable for high-density records, and insensitive to pulse overlapping. Its operation is based upon a realistic magnetic read channel, takes into account the non-idealities of the PRML system components, provides quantitative evaluation of the PRML channel performance, and evaluates errors without the use of artificially created noise, or the displacement of the head from its correct position. The method predicts error rate on the output of a realistic maximum likelihood detector and is insensitive to local noise statistics, thus taking into consideration signal-dependent noise correlations without dependence of interference between the tracks.

Furthermore, the method and apparatus simplify the error-rate evaluation procedure and make it possible to estimate the error rate in a very short time.

Although the apparatus and a method for measuring the error rate have been shown and described in the form of specific embodiments, these embodiments, the steps of the method, and the units of the apparatus have been given only as examples, and many other modifications of the method and apparatus are possible. For example, the recording media to be tested is not limited to disks and may comprise magnetic tapes, etc.

In the embodiment of FIG. 3 of the PRML channel, the standard PRML channel or any standard unit of the PRML channel (amplifier, equalizer, ADC) may be realized in a form of an integrated circuit chip.

In the embodiment of FIG. 4 of the noise processing unit, a number of modifications can be made without affecting the scope of the invention. For example, digital delay lines 92 can be made either fixed to a delay equal to a number of clock periods or with a variable and programmable delay. Noise processing unit of FIG. 4 can be split into two or more parallel channels in order to provide real time processing for high data rates. Multipliers 90 can be realized as a memory table. As another example, block diagram of FIG. 4 can be realized in a form of an integrated circuit chip.

In the embodiment of FIG. 5 of the histogrammer, a number of modifications can be made without affecting the scope of the invention. For example, an address unit 80 can be provided in the form of a memory table. Reference samples at a high signal-to-noise ratio can be estimated from input digital samples. RAM memory 82 and incrementor 84 also may be realized in a form of an integrated circuit chip.

Therefore, the scope of the invention should be determined not by the examples given, but by the appended claims and their legal equivalents.

We claim:

1. A method for measuring the error rate of a magnetic recording device storing a set of data and having a partial response maximum likelihood data detecting channel, said channel having an output, a predetermined set of values at which samples are taken, a plurality of known reference values, a plurality of predetermined sets of processing coefficients, and a plurality of control values for each reference value, said channel being set in accordance with a predetermined criterion, said method comprising the steps of:

reading at least a part of said set of data by means of said partial response maximum likelihood data detecting channel and obtaining a plurality of sampled signals from said set of data;

transforming each of said plurality of sampled signals in accordance with said plurality of known reference values into a plurality of sampled noise signals;

processing said plurality of sampled noise signals in accordance with said plurality of predetermined sets of processing coefficients, thus obtaining a plurality of processed sampled noise signals;

segregating said plurality of processed sampled noise signals in accordance with said plurality of control values, thus obtaining a segregated plurality of processed sampled noise signals;

accumulating said segregated plurality of processed sampled noise signals and sorting them into a plurality of histograms based on the frequency of occurrence of said segregated plurality of processed sampled noise signals, each histogram of said plurality of histograms having a specified measure of separation;

counting a number of histogram values corresponding to said specified measure of separation for each of said plurality of histograms and assuming the obtained number as a number of errors of said magnetic recording device corresponding to said specified measure of separation;

changing said specified measure of separation of each histogram a plurality of times and obtaining a plurality of measures of separation;

repeating said step of counting a plurality of times;

determining a dependence in accordance with said number of errors in all of said histograms for each of said specified measures of said plurality of measures of separation;

extrapolating said dependence to said predetermined criterion and determining a number of errors corresponding to said predetermined criterion; and evaluating the performance of said partial response maximum likelihood data detecting channel based upon said dependence and said extrapolating step.

2. The method of claim 1 wherein said plurality of control values comprises a plurality of classification values of said plurality of predetermined sets of processing coefficients.

3. The method of claim 2 wherein said plurality of control values further contains a plurality of validity values of said plurality of known reference values.

4. The method of claim 3 wherein said specified measure of separation comprises a margin separation distance.

5. The method of claim 1 wherein said specified measure of separation comprises a margin separation distance.

6. The method of claim 4 wherein said predetermined criterion is a predetermined value of said margin separation distance.

7. The method of claim 1 wherein said plurality of predetermined sets of processing coefficients includes at least one sequence selected from the following group of sequences: {1,0,–1};{ 1,0,0,0,–1}; {1,0,0,0,0,0,–1}; {1,0,0, 0,0,0,0,–1}; {1,1,–1,–1};{1,–1,–1,1}; {1,–1,–1,0,0,1};{1, –1,–1,–1}; {1,1,–1,–1}; {1,1,0,0,–1,–1}; {1,1,0,0,0,0,–1,– 1};{1,0,0,0,0,0,0,–1,–1}; {1,0,–1,1,0,–1};{ 1,0,–1,0,–1,0, 1}; {1,0,–1,0,0,1,0,–1};{1,0,–2,0,1}; {1,1,–1,0,1,–1,–1};{ 1,1,0,–1, –1,1,1,0,–1};{1,1,–1,0,1,–1,–1}; {1,1,–1,–1,–1, 1,1,1,}; {1,1,–1,–1,0,1,1,–1,–1};{1,2,0,–2,–1}; {1,2,0,–1,1, 0,–2,–1}.

8. The method of claim 3 wherein said plurality of predetermined sets of processing coefficients includes at least one sequence selected from the following group of sequences: {1,0,–1};{1,0,0,0,–1};{1,0,0,0,0,0,–1}; {1,0,0, 0,0,0,0,–1};{1,1,–1,–1};{1,–1,–1,1}; {1,–1,–1,0,0,1};{1, –1,–,1,–1}; { 1,1,–1,–1};{1,1,0,0,–1,–1}; {1,1,0,0,0,0,–1,– 1};{1,1,0,0,0,0,0,0,–1,–1}; {1,0,–1,1,0,–1};{1,0,–1,0,–1,0, 1}; { 1,0,–1,0,0,1,0,–1};{1,0,–2,0,1}; { 1,1,–1,0,1,–1,–1};{ 1,1,0,–1, –1,1,1,0,–1};{1,1,–1,0,1,–1,–1}; {1,1,–1,–1,–1,– 1,1,1,}; {1,1,–1,–1,0,1,1,–1,–1}; 1,2,0,–2,–1}; {1,2,0,–1,1, 0,–2,–1}.

9. The method of claim 1 wherein said values of said predetermined set of values are represented by a set of values selected by one of the following sets of values: {1,0,–1};{–1,–½,0,½,1}; {–1,–⅔,–⅓,0,⅓,⅔,1}.

10. The method of claim 1 wherein said values of said plurality of known reference values are given by a set of values selected by one of the following sets of values: {1,0,–1}; {–1,–½,0,½,1}; {–1,–⅔,–⅓,0,⅓,⅔,1}.

11. An apparatus for measuring the error rate of a magnetic recording device which stores a set of data, said apparatus comprising:

a partial response maximum likelihood data detection channel having a predetermined set of values at which samples are taken and is set in accordance with a predetermined criterion;

a reference pattern generator, generating plurality of reference samples and plurality of control values;

a subtraction unit;

a noise processing unit, having means for processing plurality of noise samples in accordance with a plurality of predetermined processing coefficients, and transforming said plurality of noise samples into a plurality of processed noise samples, and a histogrammer having means for accumulating said plurality of processed noise samples and segregating said plurality of processed noise samples into a plurality of histograms in accordance with a plurality of predetermined control values.

12. The apparatus of claim 11 wherein said partial response maximum likelihood data detection channel comprises the following elements connected in series:

an amplifier which receives said set of data and produces a plurality of amplifier output signals;

a signal equalizing unit for equalizing said amplifier output signals, said signal equalizing unit producing a plurality of equalizing output signals;

signal sampling means for sampling said plurality of equalizing output signals; and a sequence detection unit for determining the sequence in which said samples have been taken;

a timing recovery unit for synchronizing said signal sampling means, said timing recovery unit being connected to said signal sampling means and to a point between said signal sampling means and said sequence detection unit; and a gain recovery unit for controlling the gain of said amplifier, said gain recovery unit being connected to said amplifier.

13. The apparatus of claim 12 wherein said signal sampling means comprises an analog-to-digital converter.

14. The apparatus of claim 13, further including a digital equalizer connected between said signal sampling means and said sequence detector.

15. The apparatus of claim 11, wherein said noise processing unit comprises at least:
   a plurality of digital delay lines connected in series;
   a plurality of multipliers connected to the output of each of said plurality of digital delay lines and
   an adder connected to the output of each of said plurality of multipliers.

16. The apparatus of claim 11 wherein said histogrammer means comprises at least:
   an address formation unit;
   a random access memory unit; and
   an incrementor, said address unit being connected in series to said random access memory unit and to said incrementor.

17. An apparatus for measuring the error rate of a magnetic recording device which stores a set of data, said apparatus comprising:
   a partial response maximum likelihood data detection channel having a predetermined set of values at which samples are taken and is established in accordance with a predetermined criterion;
   a reference pattern generator, generating plurality of reference samples and plurality of control values;
   a subtraction unit;
   a noise processing unit, having means for processing plurality of noise samples in accordance with a plurality of predetermined processing coefficients, and transforming said plurality of noise samples into a plurality of processed noise samples, and
   a histogrammer having means for accumulating said plurality of processed noise samples and segregating said plurality of processed noise samples into a plurality of histograms in accordance with a plurality of predetermined control values.
   said partial response maximum likelihood data detection channel comprising the following elements connected in series:
   an amplifier which receives said set of data and produces a plurality of amplifier output signals;
   a signal equalizing unit for equalizing said amplifier output signals, said signal equalizing unit producing a plurality of signal equalizing unit output signals;
   signal sampling means for sampling said plurality of signal equalizing unit output signals; and
   a sequence detection unit for determining the sequence in which said samples have been taken;
   a timing recovery unit for synchronizing said signal sampling means, said timing recovery unit being connected to said signal sampling means and to a point between said signal sampling means and said sequence detection unit; and
   a gain recovery unit for controlling the gain of said amplifier, said gain recovery unit being connected to said amplifier.

18. The apparatus of claim 17 wherein said signal sampling means comprises an analog-to-digital converter.

19. The apparatus of claim 18, further including a digital equalizer connected between said sampling means and said sequence detector.

20. The apparatus of claim 17, wherein said noise processing unit comprises at least:
   a plurality of digital delay lines connected in series;
   a plurality of multipliers connected to the output of each of said plurality of digital delay lines and
   an adder connected to the output of each of said plurality of multipliers.

21. The apparatus of claim 17 wherein said histogrammer means comprises at least:
   an address formation unit;
   a random access memory unit; and
   an incrementor, said address unit being connected in series to said random access memory unit and to said incrementors.

22. An apparatus for measuring the error rate of a magnetic recording device which stores a set of data, said apparatus comprising:
   a partial response maximum likelihood data detection channel having a predetermined set of values at which samples are taken and is established in accordance with a predetermined criterion;
   a reference pattern generator, generating plurality of reference samples and plurality of control values;
   a subtraction unit;
   a noise processing unit, having means for processing plurality of noise samples in accordance with a plurality of predetermined processing coefficients, and transforming said plurality of noise samples into a plurality of processed noise samples, said noise processing unit comprising at least:
   a plurality of digital delay lines connected in series;
   a plurality of multipliers connected to the output of each of said plurality of digital delay lines and
   an adder, connected to the output of each of said plurality of multipliers
   a histogrammer having means for accumulating said plurality of processed noise samples and segregating said plurality of processed noise samples into a plurality of histograms in accordance with a plurality of predetermined control values, said histogrammer means comprising at least:
   an address formation unit;
   a random access memory unit; and
   an incrementor, said address unit being connected in series to said random access memory unit and to said incrementor.

23. The apparatus of claim 22 wherein said partial response maximum likelihood data detection channel comprises the following elements connected in series an amplifier which receives said set of data and produces a plurality of amplifier output signals;
   a signal equalizing unit for equalizing said amplifier output signals, said signal equalizing unit producing a plurality of signal equalizing unit output signals;
   signal sampling means for sampling said plurality of signal equalizing unit output signals; and
   a sequence detection unit for determining the sequence in which said samples have been taken;
   a timing recovery unit for synchronizing said signal sampling means, said timing recovery unit being connected to said signal sampling means and to a point between said signal sampling means and said sequence detection unit; and
   a gain recovery unit for controlling the gain of said amplifier, said gain recovery unit being connected to said amplifier.

24. The apparatus of claim 23 wherein said signal sampling means comprises an analog-to-digital converter.

25. The apparatus of claim 24, further including a digital equalizer connected between said sampling means and said sequence detector.

* * * * *

UNITED STATES PATENT AND TRADEMARK OFFICE
CERTIFICATE OF CORRECTION

PATENT NO. : 5,490,091
DATED : Feb 6, 1996
INVENTOR(S) : A. Kogan et al.

It is certified that error appears in the above-indentified patent and that said Letters Patent is hereby corrected as shown below:

Col. 5, line 62, change "6" to —6A—.
Col. 5, line 63, change "where plot "a"" to —with—
Col. 10, l. 11, change "FIG 6" to —Figs 6A and 6B—.
Col. 18, l. 43, start a new paragraph with "an".

Signed and Sealed this

Twelfth Day of November, 1996

Attest:

BRUCE LEHMAN

Attesting Officer    Commissioner of Patents and Trademarks